(12) United States Patent
Shiery et al.

(10) Patent No.: US 6,820,294 B2
(45) Date of Patent: Nov. 23, 2004

(54) LINKAGE FOR LIFT/LOWERING CONTROL FOR A PATIENT SUPPORTING PLATFORM

(75) Inventors: Jeffrey C. Shiery, East Leroy, MI (US); Stan Palmatier, Paw Paw, MI (US); Jerry Wheeler, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 139 days.

(21) Appl. No.: 10/083,234

(22) Filed: Feb. 26, 2002

(65) Prior Publication Data

US 2003/0159215 A1 Aug. 28, 2003

(51) Int. Cl.⁷ ............................................. A61G 7/012
(52) U.S. Cl. .................................... 5/611; 5/614; 5/11
(58) Field of Search .......................... 108/147, 147.19; 5/11, 611, 614

(56) References Cited

U.S. PATENT DOCUMENTS

| | | | |
|---|---|---|---|
| 804,784 A | * 11/1905 | Von Eschen ................... | 5/611 |
| 3,304,116 A | 2/1967 | Stryker | |
| 3,393,004 A | * 7/1968 | Williams ...................... | 296/20 |
| 4,959,957 A | * 10/1990 | Schmale et al. .............. | 60/413 |
| 5,402,543 A | * 4/1995 | Dietrich et al. ................ | 5/610 |
| 6,230,343 B1 | 5/2001 | Buiskool et al. | |
| 6,264,006 B1 | 7/2001 | Hanson et al. | |
| 6,421,854 B1 | * 7/2002 | Heimbrock .................... | 5/610 |

OTHER PUBLICATIONS

Exploded View—of Prior Art Stryker Product Renaissance Model (Circa 1990).

Photocopy of Four Photographs—of Prior Art Stryker Product Renaissance Model (Circa 1990).

* cited by examiner

Primary Examiner—Michael F. Trettel
(74) Attorney, Agent, or Firm—Flynn, Thiel, Boutell & Tanis, P.C.

(57) ABSTRACT

A wheeled carriage having a patient support deck elevatable by a pair of hydraulic jacks controlled by a foot pedal arrangement. Brakes are provided for the wheels on the wheeled carriage activatable by additional foot pedals.

12 Claims, 13 Drawing Sheets

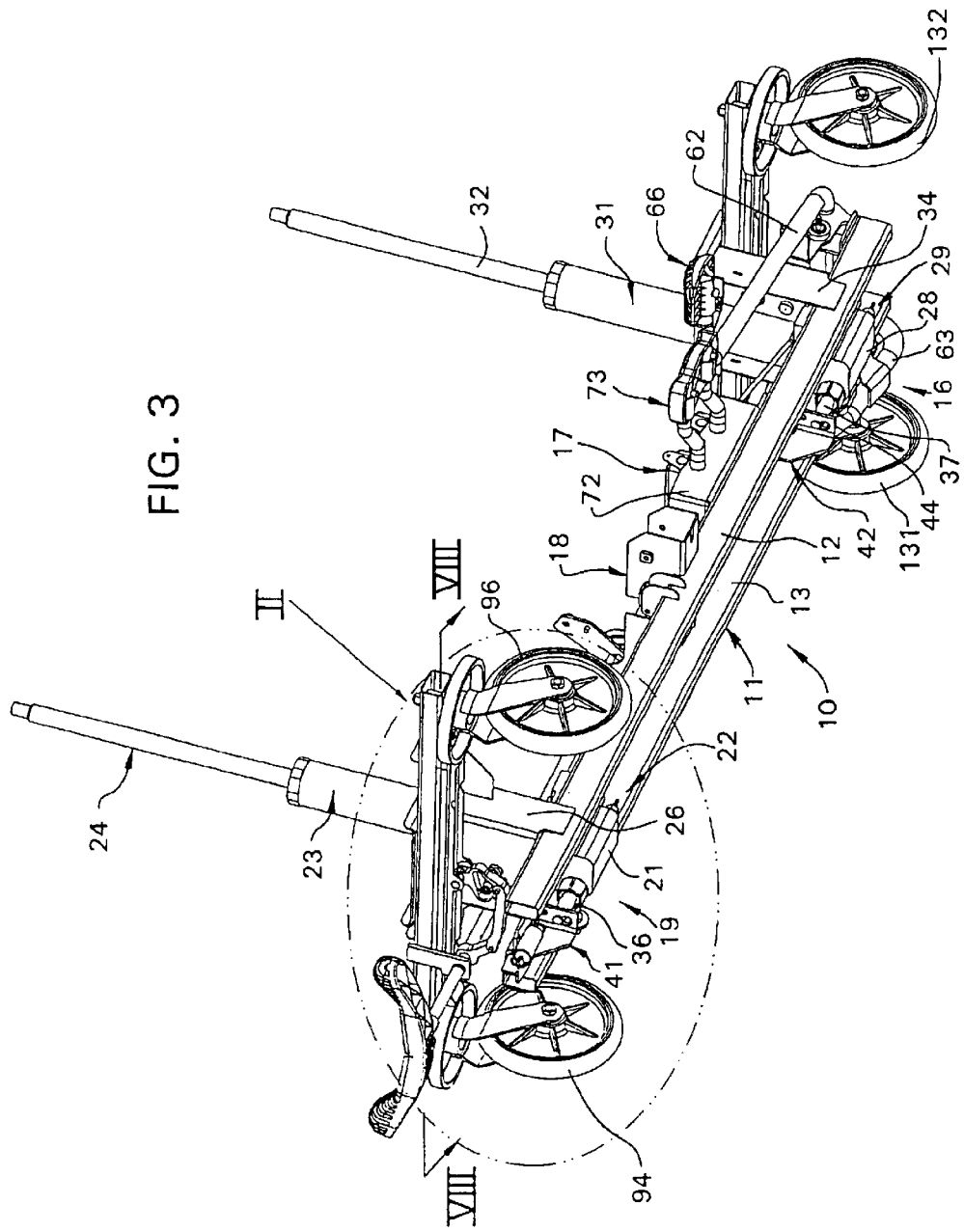

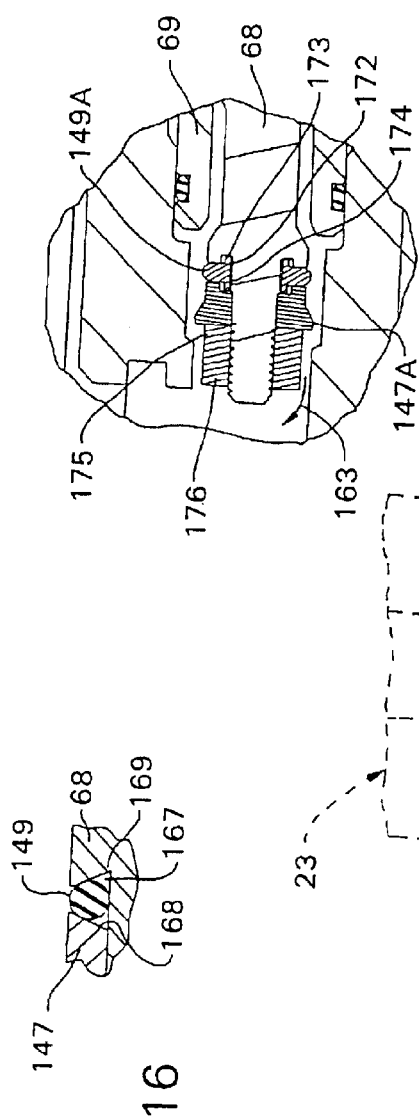
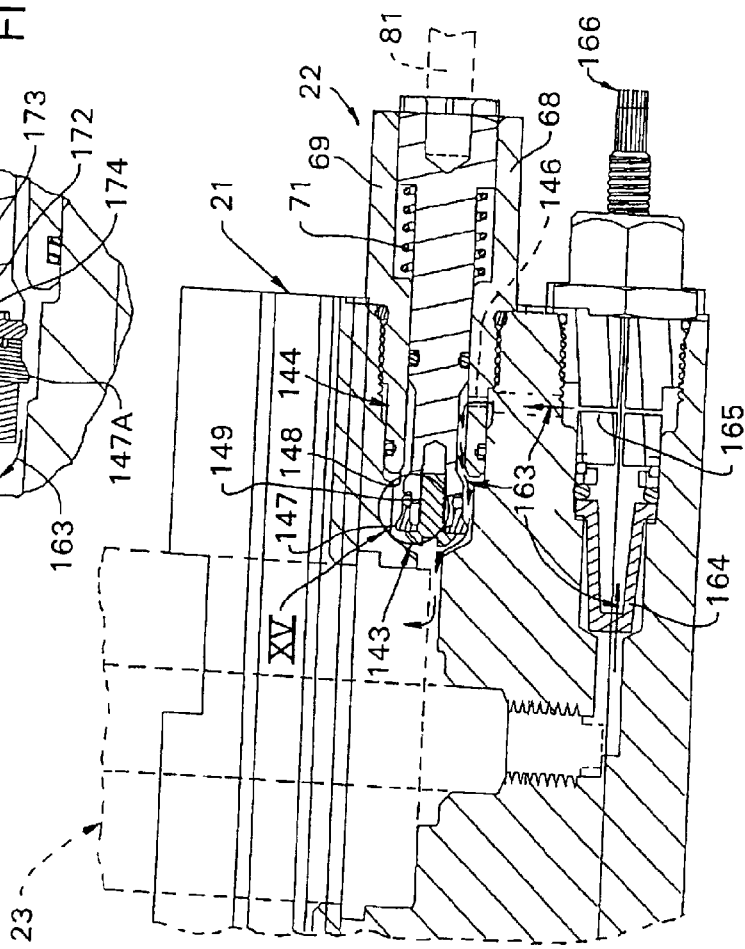

LINKAGE FOR LIFT/LOWERING CONTROL FOR A PATIENT SUPPORTING PLATFORM

FIELD OF THE INVENTION

This invention relates to a wheeled carriage for supporting a patient in a substantially horizontal position and, more particularly, to a control mechanism for facilitating control of the raising and lowering feature of onboard hydraulic jacks and to a further control mechanism for controlling the brakes which engage the wheels supporting the wheeled carriage.

BACKGROUND OF THE INVENTION

Wheeled carriages for supporting a patient in a substantially horizontal position are well known in the art and a representative example of an early version of such a device is illustrated in Dr. Homer H. Stryker's U.S. Pat. No. 3,304,116, reference to which is incorporated herein. Other of such wheeled carriages are disclosed in U.S. Pat. Nos. 6,230,343 and 6,264,006, both of which are presently owned by the Assignee of record for this invention. Reference to these latter two patents is also to be incorporated herein.

During the assembly of wheeled carriages, strict control over tolerances is always a requirement. This is especially true in mechanisms which are to facilitate the simultaneous raising function of both of the hydraulic jacks onboard the wheeled carriage. In order to effect a simultaneous raising of the hydraulic jacks, and thereby the patient supporting surface, it is essential that the stroke applied to the pumps is the same in order to maintain the patient supporting surface level. Accordingly, a structure which will facilitate the simultaneous raising of the hydraulic jacks and assuring that the stroke applied to each of the hydraulic jacks is the same is highly desired.

It is also essential that there be provided a control for facilitating a lowering of the hydraulic jacks independently of one another, as well as simultaneously. U.S. Pat. No. 6,230,343, mentioned above, provides one type of mechanism for facilitating these tasks. However, it is essential that each of the valves on the hydraulic jacks that controls the lowering function be activated to the same extent during a simultaneous lowering in order to maintain the patient supporting surface horizontal. Thus, a control mechanism for facilitating a lowering of the hydraulic jacks, either independently as well as simultaneously, and which facilitates easy adjustment to compensate for variations and tolerance is highly desirable.

It is also essential that the wheeled carriage be provided with a brake mechanism and U.S. Pat. No. 6,264,006, mentioned above, provides one form of braking mechanism. To simplify the construction of the brake mechanism and thereby effect a reduction in manufacturing expense is always a goal of every improvement. The brake mechanism disclosed herein is no exception.

SUMMARY OF THE INVENTION

The objects and purposes of the invention are met by providing an elongate base for a patient supporting platform or surface. The elongate base includes a frame having first and second hydraulic jacks mounted at spaced apart locations and adjacent opposite ends of the frame. Each of the first and second hydraulic jacks are configured to connect to the patient supporting platform for effecting a lifting and lowering of the patient supporting platform relative to the frame. The first and second hydraulic jacks each have a reciprocal input mechanism for effecting, when reciprocated, a lifting of the respective end of the patient supporting platform. Each reciprocal input mechanism has a first part of a two part releasable connection thereon. A manually operable member is mounted on the frame and enables the manually operable member to reciprocate relative to the frame. A linkage member is provided and has a pair of longitudinally spaced second parts thereon, each second part being releasably connected to a respective one of the first parts to effect a connecting of the manually operable member to each of the reciprocal input mechanisms. The linkage is configured to convert the reciprocal movement of the manually operable member to a reciprocal movement of the linkage member to effect a simultaneous lifting of the patient supporting platform in response to the reciprocal movement of the linkage member.

The objects and purposes of the invention are also met by providing on the elongate base set forth above another additional input mechanism on each of the first and second hydraulic jacks for effecting, when reciprocated, a lowering of the patient supporting platform. The additional reciprocal input mechanisms each have a first part of a two part releasable connection thereon, while an additional manually operable member releasably connects through link members to effect a lowering of each hydraulic jack and, consequently, both ends of the patient supporting platform in response to the reciprocal movement of the link members.

The objects and purposes of the invention are additionally met by providing a wheeled carriage for supporting a patient in a substantially horizontal position and a brake mechanism for simultaneously braking each of the castered wheels supporting the wheeled carriage. The brake mechanism includes a pair of elongate bars oriented at opposite ends of the wheeled carriage and which extend transversely of a longitudinal axis of the wheeled carriage. Adjacent opposite ends of each elongate bar there is provided a wheel engaging member. The elongate bar is elastically yieldable and a cam mechanism is provided for effecting a flex of the elongate bar as the wheel engaging members engage the wheels. Upon release of the brake, springs are provided to return the elongate bar to its original unbraked position.

BRIEF DESCRIPTION OF THE DRAWINGS

Other objects and purposes of this invention will be apparent to persons acquainted with apparatus of this general type upon reading the following specification and inspecting the accompanying drawings, in which:

FIG. 3 is an isometric view of the underside of the wheeled carriage and from an end opposite to that illustrated in FIG. 1;

FIG. 14 is a sectional view taken along the line XIV—XIV in FIG. 7;

FIG. 15 is an enlargement of a portion of the circled region XV in FIG. 14; and

FIG. 16 is an enlarged fragment of a modified seal on an innermost end of the plunger.

DETAILED DESCRIPTION

Figure 1:
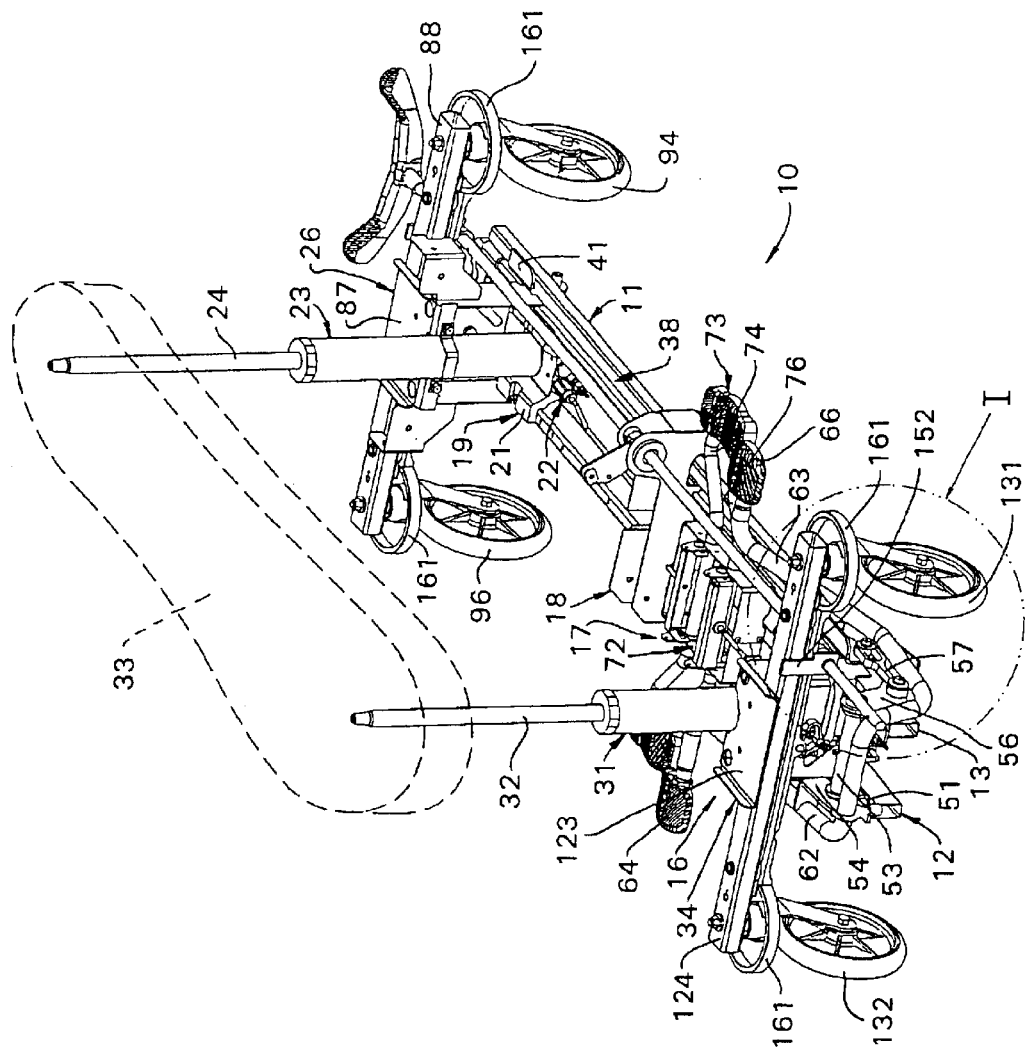
FIG. 1 is an isometric view of a wheeled carriage embodying the inventions, the patient supporting platform being only schematically illustrated in broken lines.

Certain terminology will be used in the following description for convenience in reference only, and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

Figure 7:
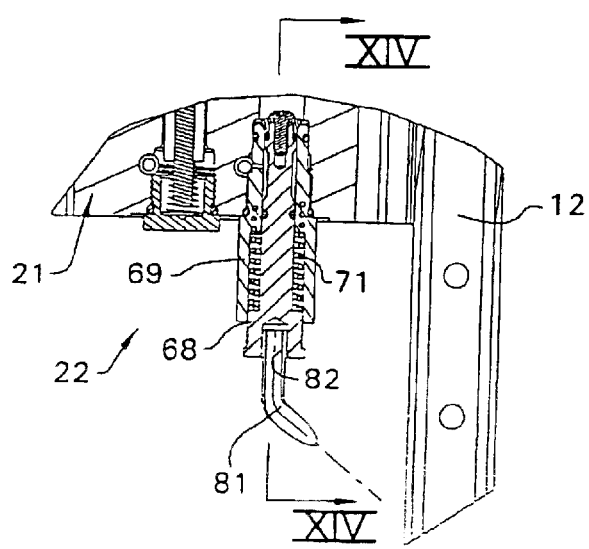
FIG. 7 is a sectional view taken through the base of one of the two hydraulic jacks and particularly illustrating the valve for effecting a lowering of the hydraulic jacks.

FIG. 1 illustrates a wheeled carriage 10 embodying the invention. The wheeled carriage 10 includes a frame 11 composed of a pair of laterally spaced elongate support bars that extend parallel to each other. The parallel support bars 12 and 13 are interconnected at a plurality of locations, such as at locations 16, 17, 18 and 19. The structure for interconnecting the support bars 12 and 13 at location 19 consists of a manifold plate 21 having a hydraulic valving mechanism 22 embedded therein in the region between the parallel support bars 12 and 13. This valving mechanism is also illustrated in FIG. 7. Further details of the valving mechanism 22 will be described below.

A hydraulic cylinder housing 23 is mounted in an upstanding relation on the part of the manifold plate 21 that extends between the parallel support bars 12 and 13. The cylinder housing 23 includes a reciprocal piston rod 24 configured for movement between extended positions and retracted positions relative to the cylinder housing 23.

The location 19 also includes a bracket assembly 26 that is oriented in an upstanding relation relative to the manifold plate 21, and operatively connects through a strap 27 the cylinder housing 23 in order to maintain the cylinder housing in a stable condition on the manifold plate 21.

The structure at location 16 is identical to the structure described above with respect to the location 19. That is, and referring also to FIG. 5, a manifold plate 28 interconnects the parallel support bars 12 and 13. The manifold plate 28, like the manifold plate 21, houses a hydraulic valving mechanism 29 identical to the valving mechanism 22.

A cylinder housing 31 is mounted on the portion of the manifold plate 28 that extends between the parallel support bars 12 and 13 and extends in an upward manner identical to the cylinder housing 23. The cylinder housing 31 has thereon a reciprocally moveable piston rod 32 extending parallel to the piston rod 24. A patient support deck 33, schematically illustrated in broken lines in FIG. 1, mounts onto the upper free ends of each of the piston rods 24 and 32.

A bracket assembly 34, similar to the bracket assembly 26, is also provided at the location 16 and extends upwardly from the manifold plate 28 and includes a strap similar to the strap 27 for stabilizing the cylinder housing 31 thereon.

The hydraulic cylinder housings 23 and 31, also known as the hydraulic jacks, may be of the type wherein the reservoir of fluid used for raising the rods 24 and 32 and, consequently, the patient support deck 33 is provided by a casing around the cylinder. Thus, when it becomes desirable to raise the patient support deck, a pumping mechanism provided in each of the manifold plates 21 and 28 can be activated to move hydraulic fluid out of the reservoir space and into the cylinder and, when it becomes desirable to lower the patient support deck 33, hydraulic fluid can be permitted to move back into the reservoir space by activating a respective valve mechanism 22 and/or 29. While the specific valving is well known for accomplishing the aforesaid tasks, the various members that will affect an operation of the pump as well as an operation of the valve mechanisms 22 and 29 will be explained in more detail below.

Figure 4:
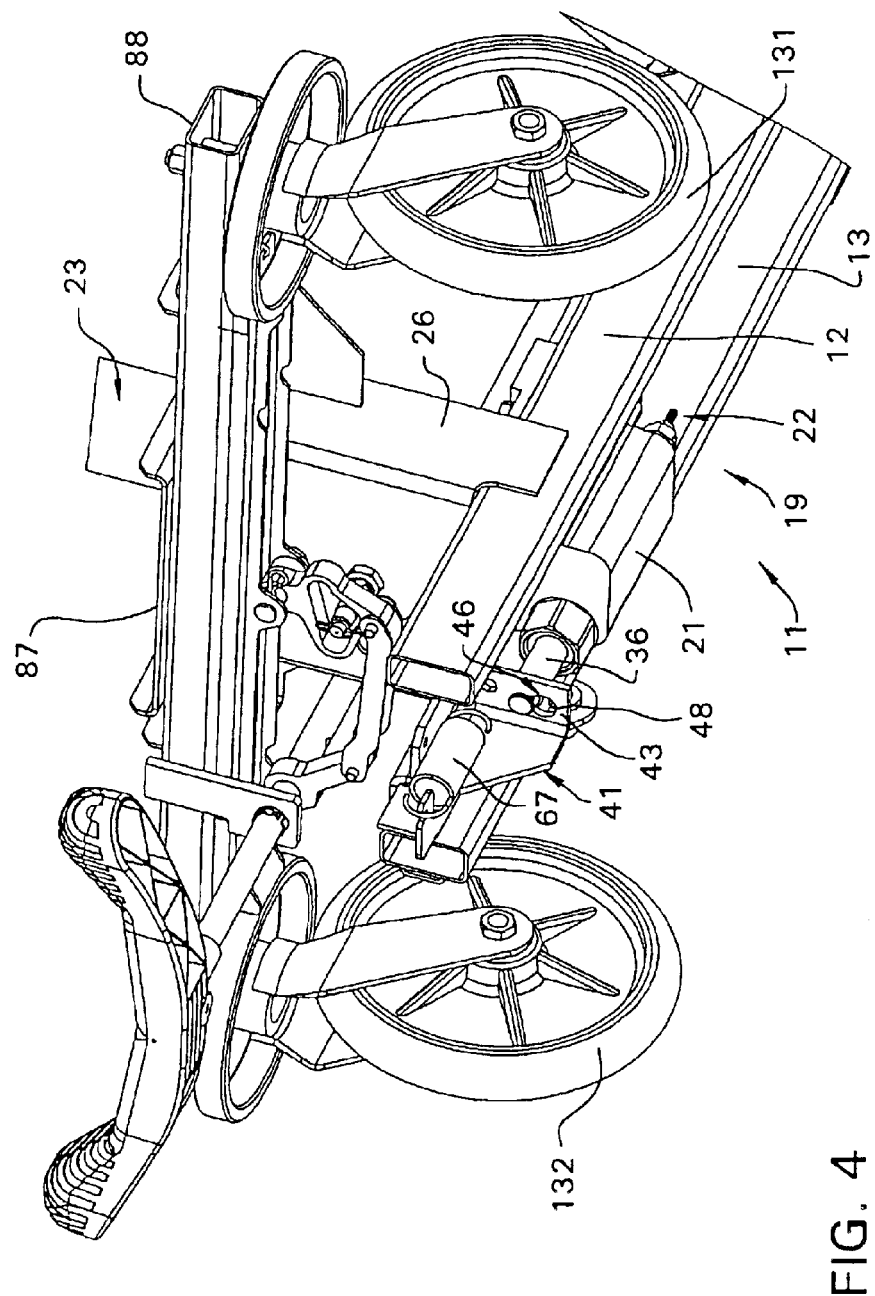
FIG. 4 is an enlarged fragment of the encircled portion II of FIG. 3.
Figure 5:
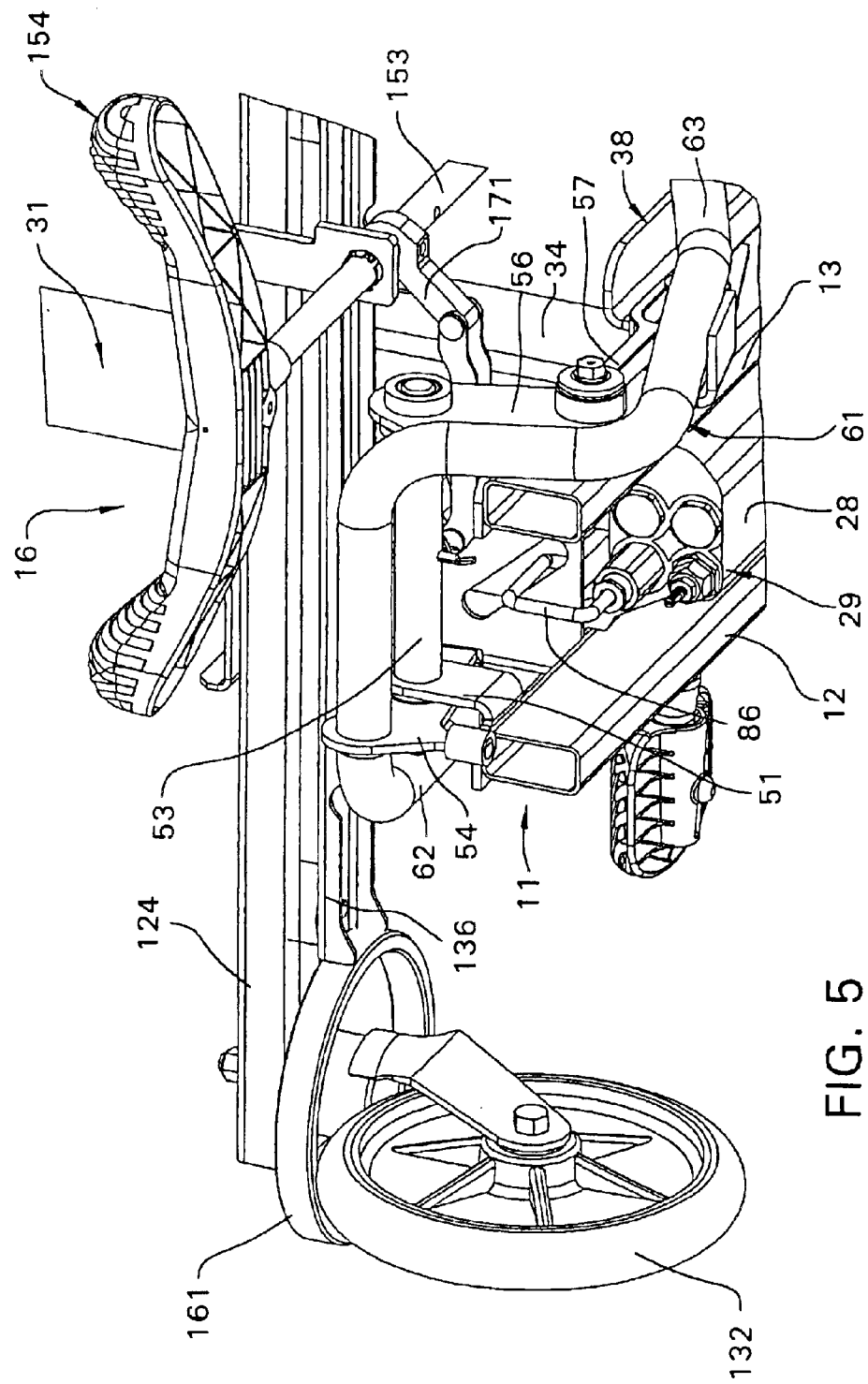
FIG. 5 is an enlarged fragment of the end of the wheeled carriage corresponding to FIG. 2.
Figure 6:
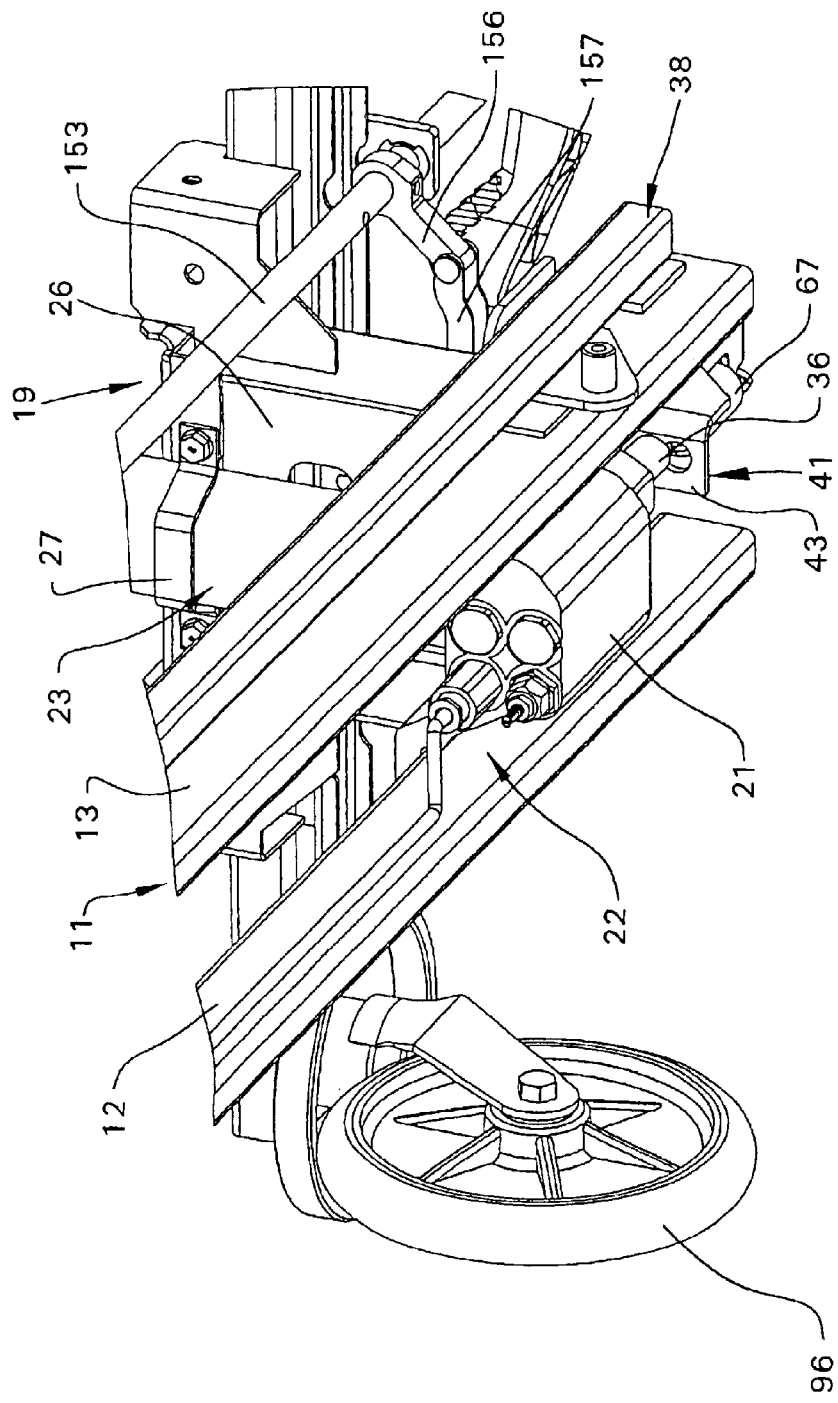
FIG. 6 is an enlarged segment of the right end of the wheeled carriage illustrated in FIG. 3.

The pumping mechanism for effecting delivery of hydraulic fluid to the respective cylinder housings 23 and 31 to effect a raising of the patient support deck 33 includes the following described structure. The manifold plate 21 has a reciprocal piston member 36 (FIGS. 3 and 4) for effecting a transference of hydraulic fluid from a fluid reservoir to the cylinder housing 23. Similarly, the manifold plate 28 has a reciprocal piston member 37 for effecting transference of hydraulic fluid from a reservoir to the cylinder housing 31. The reciprocal piston members 36 and 37 are interconnected by an elongate rail 38 (FIGS. 1, 5 and 6). The elongate rail 38 has a pair of lengthwise spaced brackets 41 and 42 (FIG. 3) secured thereto. Each of the brackets 41 and 42 extend over the top of the support bar 13 in order to present a flat plate-like part 43 and 44 and in a plane which is perpendicular to the axes of reciprocation for each of the piston members 36 and 37. Each of the piston members 36 and 37 has a section of reduced diameter along the length thereof. Each of the plates 43 and 44 have a keyhole-shaped opening 46 and 47 therein, that is, a hole having two interconnected openings, one larger than the other. The larger opening 48 illustrated only in FIG. 4 is oriented below the smaller opening, the smaller opening receiving therein the section of the piston members 36 and 37 which is of a reduced diameter so as to effect an interlocking of each of the brackets 41 and 42 with a respective piston member 36 and 37 without requiring any tools or mechanical fasteners, such as screws, bolts or the like. All that the assembler needs to do is to align the larger diameter opening 48 with each of the piston members 36 and 37, and move the brackets 41 and 42 to bring the sections of reduced diameter on each of the piston members 36 and 37 into alignment with the smaller diameter opening of each of the openings 46 and 47.

Figure 2:
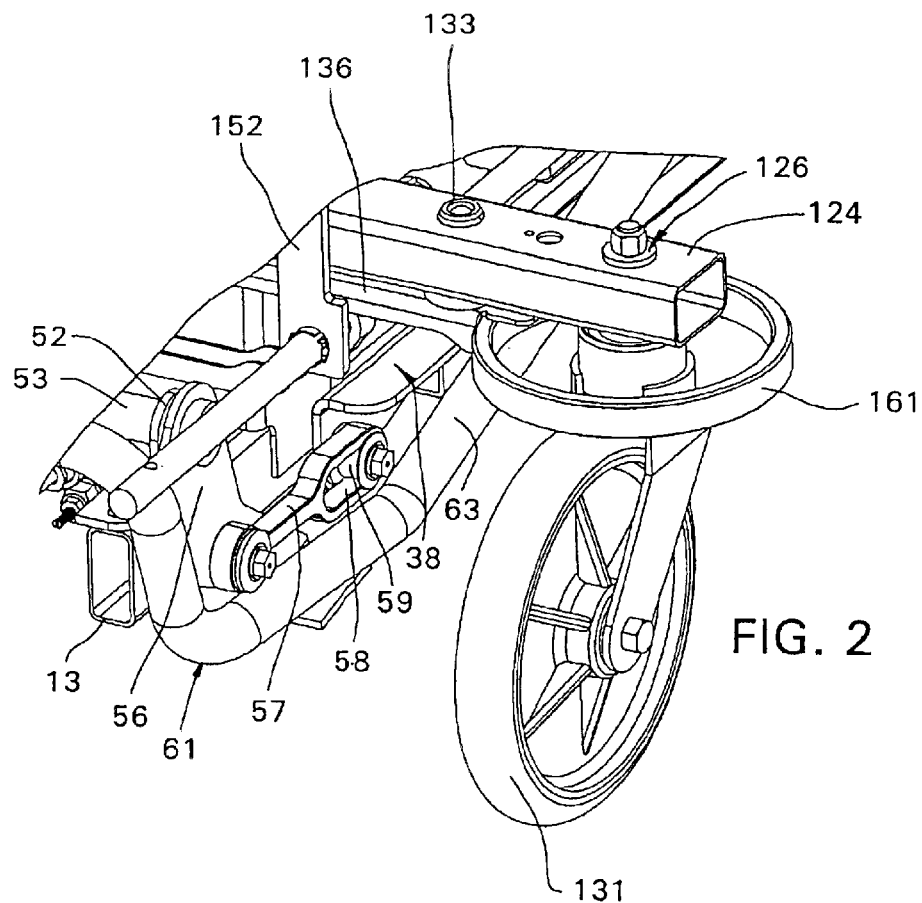
FIG. 2 is an enlarged fragment of the encircled portion I of FIG. 1.

As illustrated in FIGS. 1, 2 and 5, a bracket 51 is mounted to the support bar 12. Laterally spaced therefrom is a similar bracket 52 (FIG. 2) mounted on the support bar 13. The brackets 51 and 52 define a mount for a laterally extending rotatable axle 53. A pair of support arms 54 and 56 are fixably secured to the rotatable axle 53 for movement therewith. A link 57 is provided for interconnecting the support arm 56 to one end of the elongate rail 38 as illustrated in FIG. 2. The link includes at one end thereof an elongate slot 58 in which slides a connector 59 interconnecting the link 57 to the elongate rail 38.

A U-shaped pedal support is fixably secured to the support arms 54 and 56 as illustrated in FIGS. 1 and 2. That is, a leg 62 of the U-shaped pedal support 61 is secured to the support arm 54 whereas a leg 63 is secured to the support arm 56, both connections being preferably by welding. The free ends of the legs 62 and 63 of the U-shaped pedal support 61 includes manually engagable foot pedals 64 and 66, respectively. A tension spring 67 (FIG. 4) connects the support bar 13 to the bracket 41 on the elongate rail 38. As a result, when a downward force is applied to one of the foot pedals 64 or 66, the support arms 54 and 56 will pivot about the axle 53 to cause the link 57 to pull on the elongate rail 38 against the spring force provided by the spring 67. Upon a release of the downward pressure on a respective one of the foot pedals 64 or 66, the spring 67 will draw the elongate rail back toward its original position effecting a raising of the foot pedals 64 and 66 to their initial position. A repetitive cycle of downwardly applied force to a respective one of the pedals 64 and 66 will, therefore, effect a reciprocal movement of the piston members 36 and 37 on the manifold plates 21 and 28 to effect a transference of hydraulic fluid from the fluid reservoir to the respective cylinder housings 23 and 31 to effect a raising of the patient support deck 33.

The structure for releasing the hydraulic fluid in the respective cylinder housings 23 and 31 and facilitating its return to the reservoir through the hydraulic valve mechanisms 22 and 29 is illustrated in FIGS. 7 and 13–15 and is described as follows. Referring to FIG. 7, and as stated above, the hydraulic valve mechanism 22 is identical to the hydraulic valve mechanism 29. Accordingly, only the valve mechanism 22 illustrated in FIGS. 7 and 13–15 will be described. The valve mechanism 22 includes a plunger 68 that is moveable into and out of a hollow sleeve 69 provided on the manifold plate 21 against the urging of a spring 71. The plunger 68 has adjacent an innermost end (left end 143 in FIG. 14) a region 144 of reduced diameter communicating with an orifice 146 in the sleeve 69. A valve member 147 is configured to engage and seal with a valve seat 148 at the innermost end of the sleeve 69 to shut off valve flow. Since the cross sectional area of the plunger 68 and the right side of the valve member 147 adjacent an o'ring 149 are the same when the valve member 147 is engaged with the valve seat 148 on the sleeve 69, the fluid pressure in the region 144 acts equally in opposite axial directions of the plunger 68 so that only the normal force of the spring 71 need be overcome to effect a release of fluid from the hydraulic jack to allow the patient support deck 33 to be lowered. As a result, when the pumping mechanisms are operated through a reciprocation of the piston members 36 and 37, the increased pressure in the pathway 163 will not require an increased force to effect a lowering of the patient support deck 33. When the plunger 68 is moved inwardly of the sleeve 69 against the urging of the spring 71 as shown in FIG. 14 to move the valve 147 away from the valve seat 149, hydraulic fluid will be allowed to flow in a pathway 163 from the cylinder housing 23 through a filter 164, a throttling orifice 165 to the not illustrated fluid reservoir oriented in a known way inside of the hydraulic jack 23 structure. The mechanism for facilitating a movement of the plunger 68 into the sleeve 69 will be described in more detail below. The speed of downward movement of the patient support deck 33 is manually controlled by an adjustment mechanism 166 regulating the size of the throttling orifice 146.

The velocity of the fluid traveling in the pathway 163 past the o'ring 149 can be sufficient to pull the o'ring from the groove 167 therefor. Thus, the o'ring groove 167 is formed on two sides on the plunger 68 and on a third side by the right end of the valve member 147 as depicted in FIG. 15. The opposing side walls 168 and 169 of the groove 167 converge toward the open part of the groove so that when the valve member 147 is assembled onto the plunger 68, the o'ring 149 will become entrapped in the groove so that fluid velocity will not be able to effect a removal of the o'ring from the groove.

Alternatively, a modification depicted in FIG. 16 can be provided. Since the componentry is the same, the same reference numerals have been used but with the suffix "A" added so as to minimize surplusage of descriptive text. The o'ring 149A depicted in FIG. 16 can be utilized. It has a T-shape with one end 172 of the cross part of the T being received in an undercut 173 provided on the plunger 68A and the other end 174 being received in an undercut 175 provided on the valve member 147A upon a tightening of a nut 176 on a thread provided at the innermost end of the plunger 68, the valve member 147 will move toward the undercut 173 to effect a compressing of the ends 172 and 174 into the respective undercuts 173 and 175 to fixedly orient the o'ring 149A on the plunger 68. The o'ring may also be bonded to the plunger 68, if desired.

Figure 12:
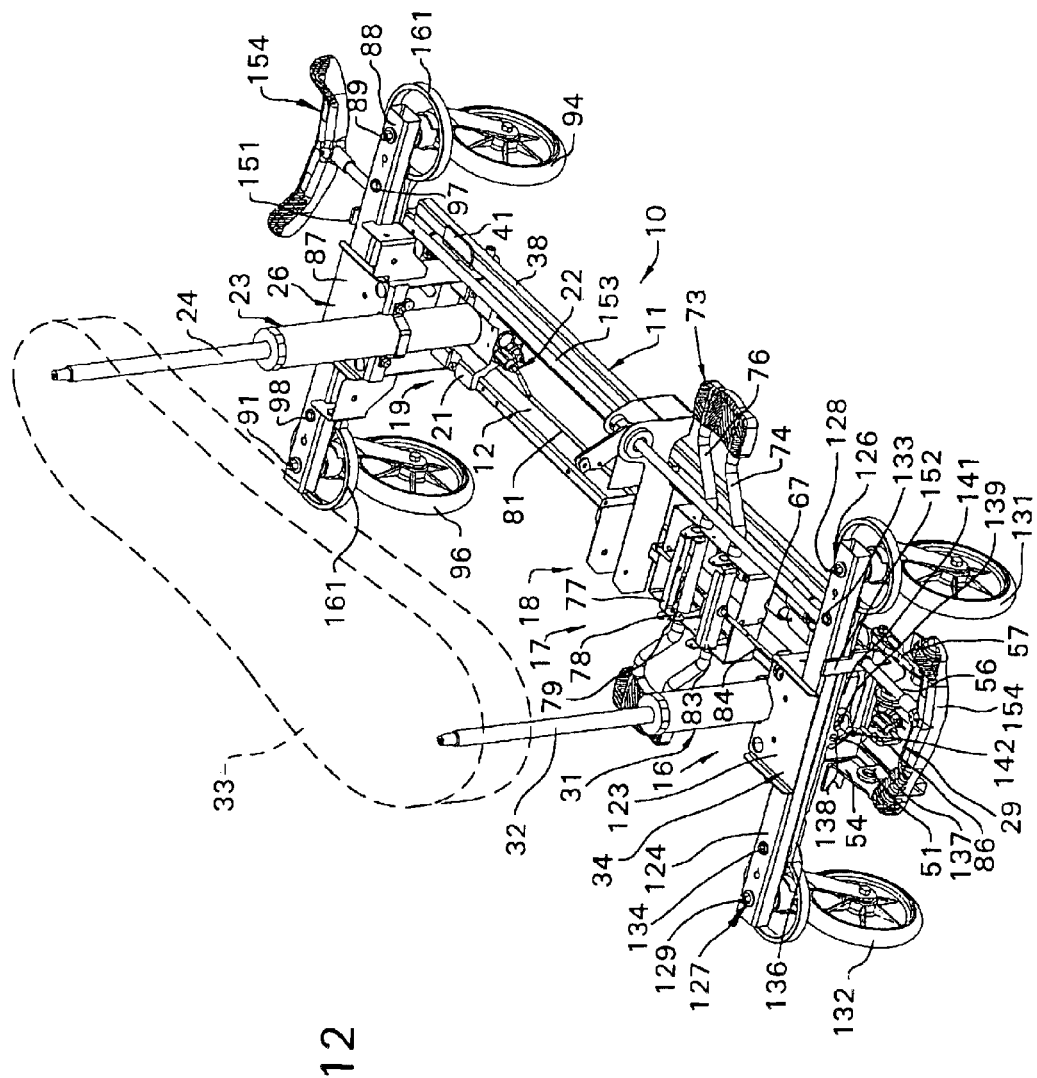
FIG. 12 is a view similar to FIG. 1 with the pedal and related support for effecting operation of the lifting feature of the hydraulic jacks being removed.
Figure 13:
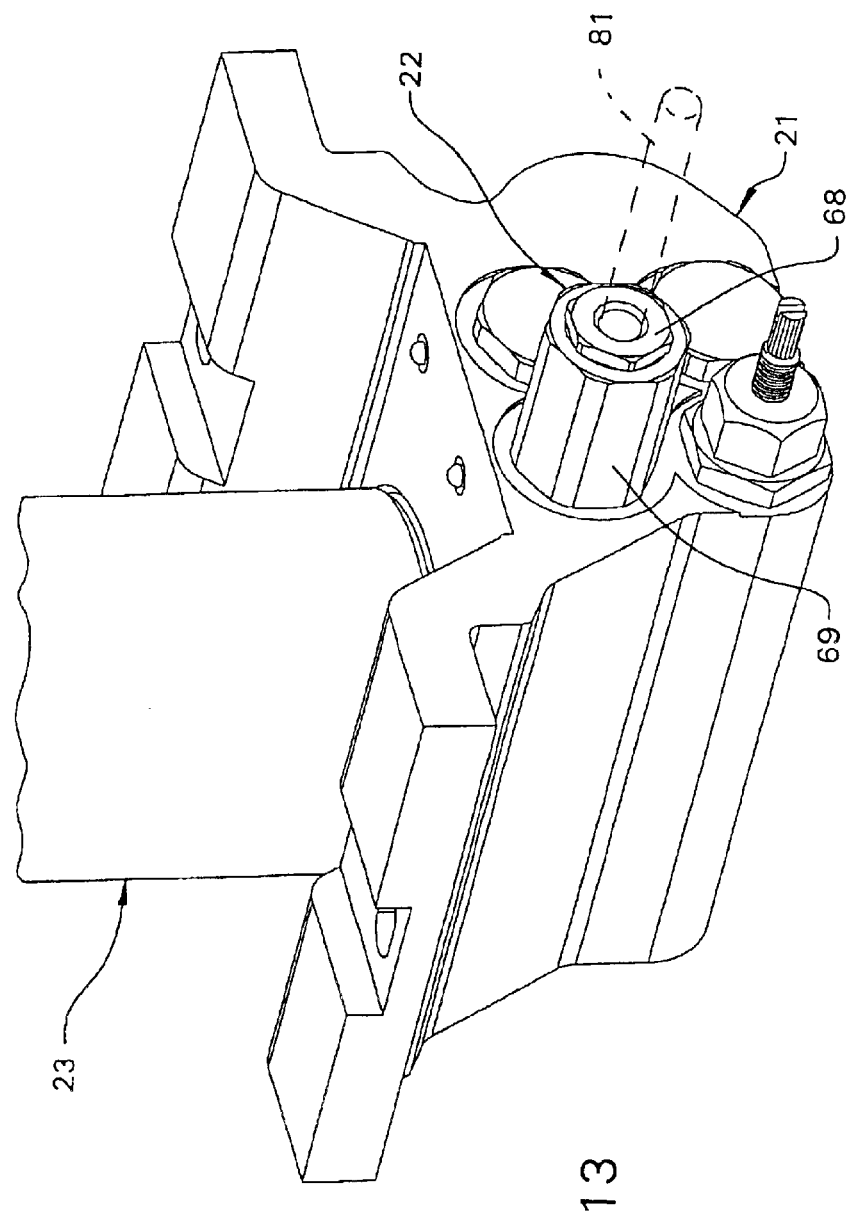
FIG. 13 is a fragmentary isometric view of the base of the hydraulic jack illustrated in FIG. 7.

The position 17 includes a frame 72 connected to each of the support bars 12 and 13 and provide the support for a pedal arrangement 73 identical to that disclosed in the aforementioned U.S. Pat. No. 6,230,343. As stated above, the subject matter of this patent is to be incorporated herein by reference. The unique feature of the pedal arrangement 73 disclosed herein is the connection of each of the respective pedal operator members 74 and 76 to a respective one of the valve mechanisms 22 and 29. It is to be understood that each of the pedal operator members 74 and 76 is returned to its original position by a not illustrated spring device. As illustrated in FIG. 12, a bracket 77 includes a flange 78 having an elongate slot 79 therein, which slot 79 releasably receives a pin moveable with the pedal operator member 76 to cause movement of the bracket 77 toward the valve mechanism 22. An elongate rod 81 interconnects the bracket 77 to the plunger 68 illustrated in FIG. 7. In this particular embodiment, the distal end of the plunger 68 has a pocket 82 therein configured to receive the end of the rod 81 most remote from the bracket 77. As a result, when the pedal operator member 76 is rocked, the bracket 77 will urge the rod 81 rightwardly (FIG. 12) to cause the end of the rod 81 received in the pocket 82 to push on the plunger 68 against the urging of the return spring 71.

Similarly, a bracket 83 is connected to the pedal operator member 74 by a releasable type connection identical to that connecting the pedal operator member 76 to the bracket 77. An elongate rod 84 extends from the bracket 83 to the plunger of the valve mechanism 29. Since the valve mechanism 29 is oriented on a side of the manifold plate 28 remote from the bracket 83, the rod 84 has a U-shaped bend as at 86, so that when the pedal operator member 74 is rocked to cause the bracket 83 to move rightwardly referring to FIG. 12, the distal end of the rod 86 received in the pocket in the plunger of the valve mechanism 29 will cause the plunger to be moved into its respective sleeve against the urging of the return spring.

In order to facilitate ease of adjustment of the position of the rods 81 and 84 with respect to the brackets 77 and 83, respectively, the connection between the rods and the respective brackets is rendered adjustable, as by a conventional threaded arrangement, so that the extent to which each rod projects into a pocket of the respective valve mechanism 22 or 29 is accurately controlled. Further, assembly is greatly simplified by reason of the fact that the brackets 77 and 83 are releasably connected to the operator members 76 and 74 simply by sliding the pins in the slots 79 against the urging of the return springs of the valves 22 and 29 to facilitate removal of the respective rods or installing them.

The following description relates to the braking mechanism for braking each of the wheels on the wheeled carriage 10. As illustrated in FIGS. 1, 3 and 12, the locations 16 and 19 each have respective bracket assemblies 34 and 26. Referring first to the bracket assembly 26, it includes a horizontally extending plate 87 to the underside of which is connected a laterally extending beam 88. The beam 88 includes a pair of laterally spaced mounts 89 and 91 (FIG. 8) for receiving the stems 92 and 93 of respective castered wheels 94 and 96. The beam 88 also includes a pair of laterally spaced guides 97 and 98 having vertically aligned and parallel openings 99 and 101, respectively.

Figure 9:
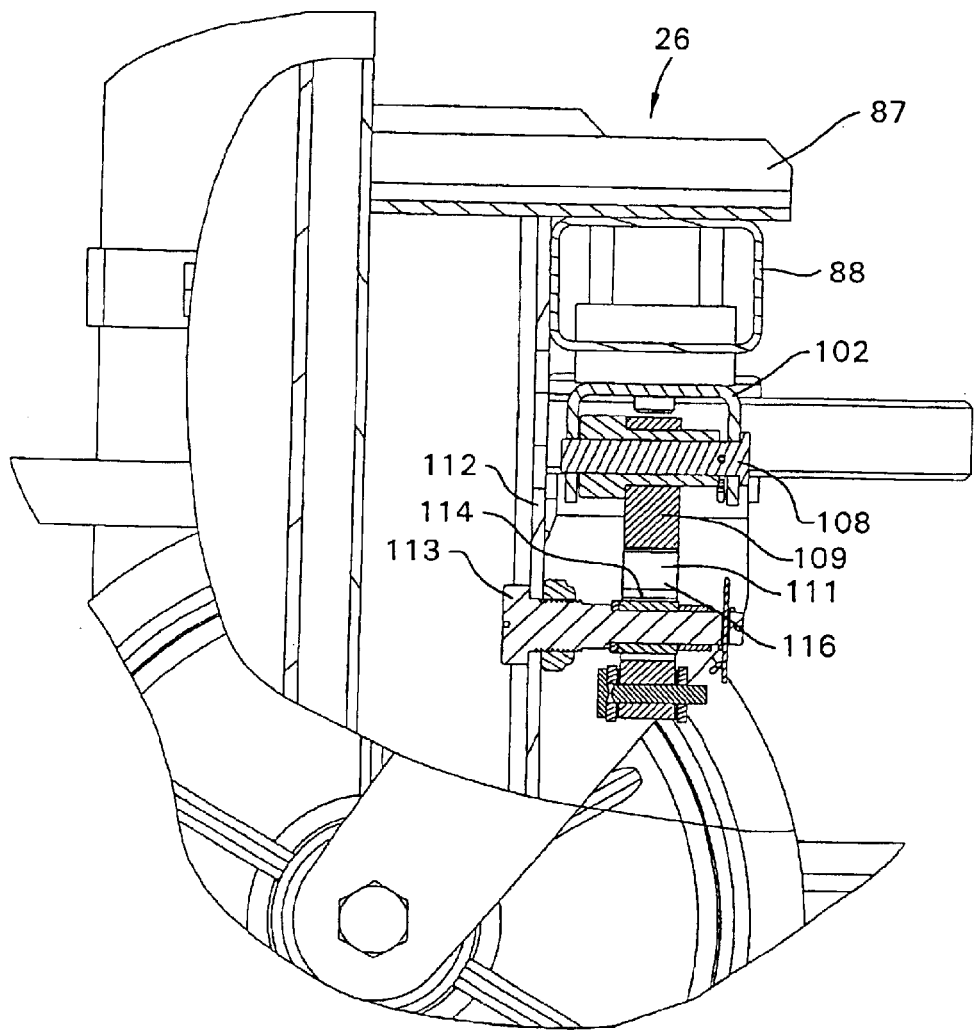
FIG. 9 is a sectional view taken along the line IX—IX of FIG. 8.
Figure 10:
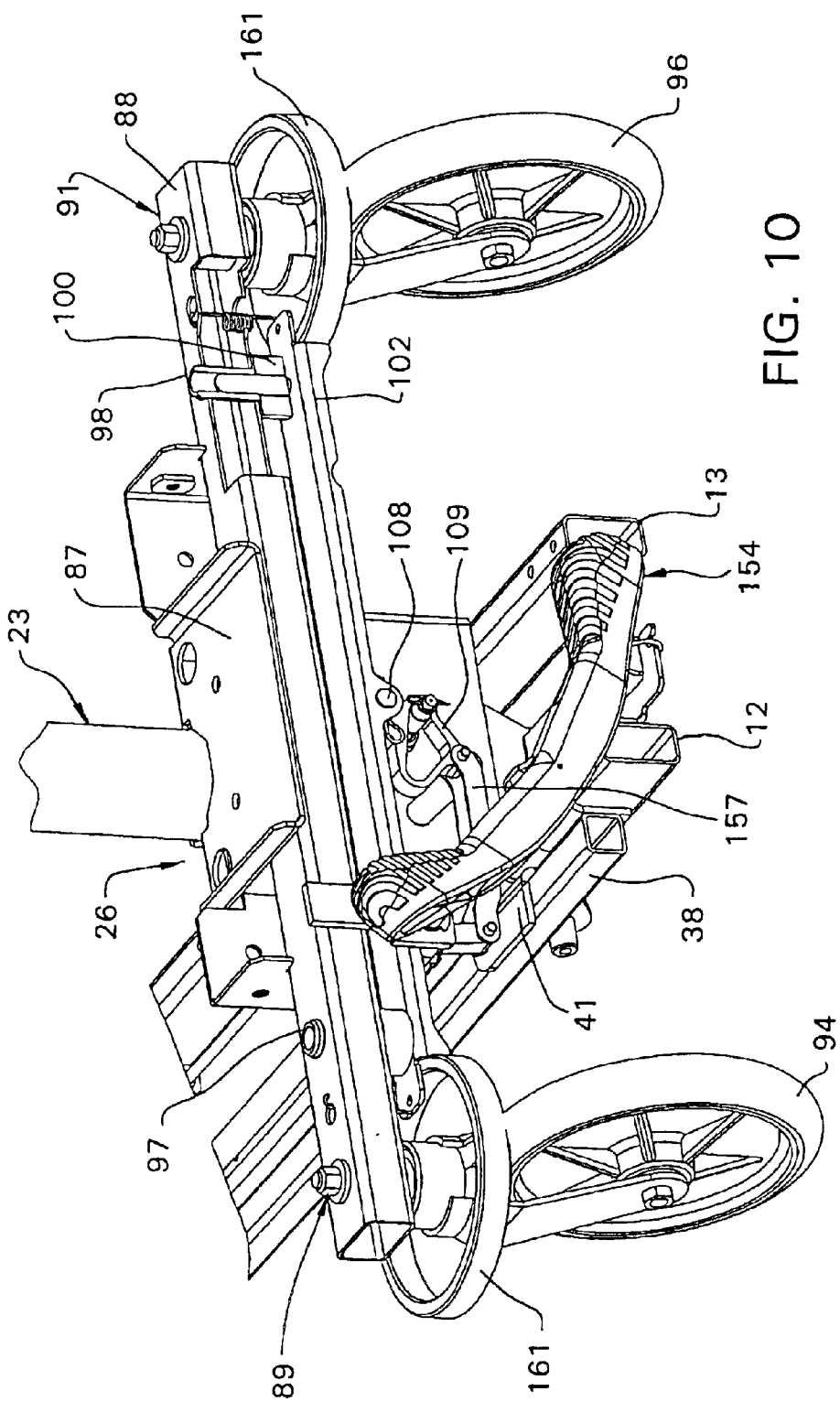
FIG. 10 is a view similar to FIG. 4 except that the brake activating mechanism has been shifted to effect a braking of the wheeled carriage.

A laterally extending elongate bar 102 is suspended beneath the beam 88 by a pair of tension springs 103 and 104. Spacers 100 limit the upward travel of the bar 102 relative to the beam. The elongate bar 102 has a pair of laterally spaced upstanding pins 106 and 107 thereon received in the openings 99 and 101, respectively, of the respective guides 97 and 98. As illustrated in FIG. 9, the elongate bar 102 is of an inverted U shape and at the mid-length thereof an axle 108 extends between the legs of the elongate bar. A cam element 109 is pivotally suspended from the axle 108. The cam element 109 has an opening 111 therein having a generally upside down, generally equilateral triangle shape.

The bracket 26 also includes a vertically upright wall member 112 having affixed thereto an elongate rod 113 projecting perpendicularly with respect thereto and into and through the opening 111 in the cam element 109 as illustrated in FIG. 9. A roller member 114 is rotatably supported on the elongate rod 113 and is adapted to roll on a surface 116 of the opening 111. The tension provided by the springs 103 and 104 raise the elongate bar 102 and, consequently, the cam element 109 to cause the roller member 114 on the elongate rod 113 to be received into the downwardlymost located corner of the triangular shaped opening 111.

Referring first to the bracket assembly 34 (FIG. 12), it also includes a horizontally extending plate 123 to the underside of which is connected a laterally extending beam 124. The beam 124 includes a pair of laterally spaced mounts 126 and 127 (FIG. 12) for receiving the stems 128 and 129 of respective castered wheels 131 and 132. The beam 124 also includes a pair of laterally spaced guides 133 and 134 having vertically aligned and parallel openings.

A laterally extending elongate bar 136, identical to the elongate bar 102, is suspended beneath the beam 124 by a pair of tension springs just like the 103 and 104. The elongate bar 136 has a pair of laterally spaced upstanding pins thereon received in the openings of the respective guides 133 and 134. Just as with the elongate bar 102 illustrated in FIG. 9, the elongate bar 136 is of an inverted U shape and at the mid-length thereof an axle 137 extends between the legs of the elongate bar. A cam element 138, identical to the cam element 109, is pivotally suspended from the axle 137. The cam element 138 has an opening 139 therein having a generally upside down, generally equilateral triangle shape identical to the opening 111.

The bracket 34 also includes a vertically upright wall member 141 having affixed thereto an elongate rod 142 projecting perpendicularly with respect thereto and into and through the opening 139 in the cam element 138 as was described earlier in relation to the structure illustrated in FIG. 9. A roller member just like the roller member 114 is rotatably supported on the elongate rod 142 and is adapted to roll on a surface of the opening 139. The tension provided by the springs raise the elongate bar 136 and, consequently, the cam element 138 to cause the roller member on the elongate rod 142 to be received into the downwardlymost located corner of the triangular shaped opening 139.

Figure 11:
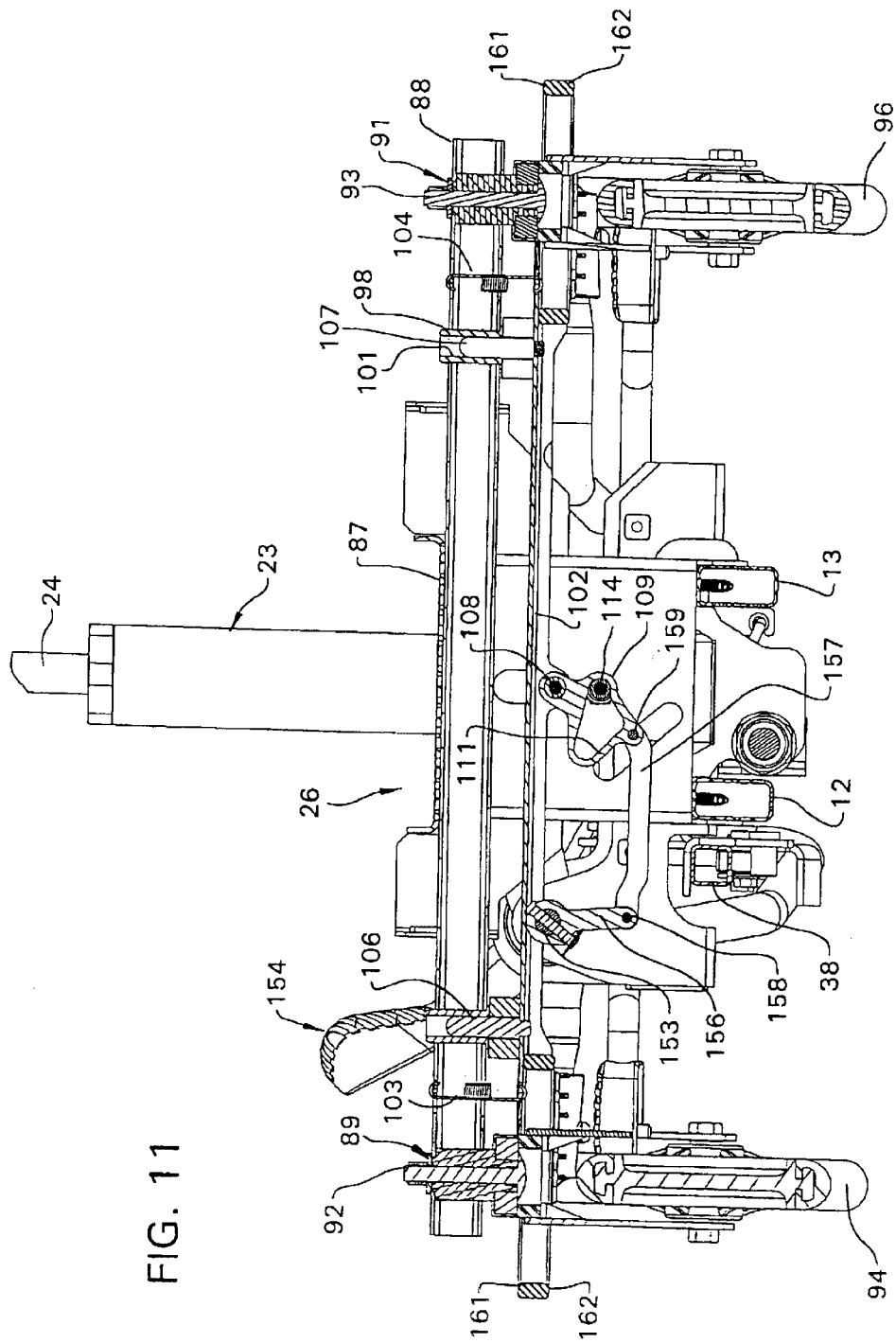
FIG. 11 is a sectional view similar to FIG. 8 except that the brake activating mechanism has been shifted to effect a braking of the wheeled carriage.

Laterally extending beams 88 and 124 each include a bracket 151 and 152, respectively. The brackets 151 and 152 each have an opening therein axially aligned with the other. An elongate rod 153 is rotatably supported by the brackets 151 and 152. A foot pedal 154 is fixedly secured to each end of the elongate rod 153. A crank arm 156 (FIG. 8) is secured to the elongate rod 153 and a link 157 interconnects the distal end of the crank arm 156 to the cam element 109 adjacent the lowermost angle of the upside down triangular shaped opening 111. More specifically, the link 157 is connected at one end by a pin 158 to the distal end of the crank arm 156 and, at the other end, by a pin 159 to the cam element 109. As a result, when force is applied to the foot pedal 154 to cause a clockwise rotation in FIG. 8 of the crank arm 156, the link 157 will cause the cam element 109 to also pivot clockwise about the axle 108 to the position illustrated in FIG. 11 where the roller enters the rightmost angle of the upside down triangular shaped opening 111. This movement will cause the elongate bar 102 to be drawn downwardly against the urging of the springs 103 and 104.

The elongate bar 102 has at the opposite ends thereof a pair of circular rings 161 fixably secured thereto. The rings 161 each have a diameter that will cause the downwardly facing edge 162 of each ring 161 to contact a peripheral surface of the wheels 94 and 96 no matter what castered position they may be in, in response to a downward movement of the elongate bar 102 against the aforesaid urging of the springs 103 and 104. Thus, the aforesaid movement of the crank arm 156 from the position illustrated in FIG. 8 to the position illustrated in FIG. 11 will bring the lowermost edge 162 of each of the rings 161 into contact with the peripheral surface of each of the wheels 94 and 96 to effectively brake the wheels. This form of operative engagement of a ring with the peripheral surface of the wheel is well known in the art.

Figure 8:
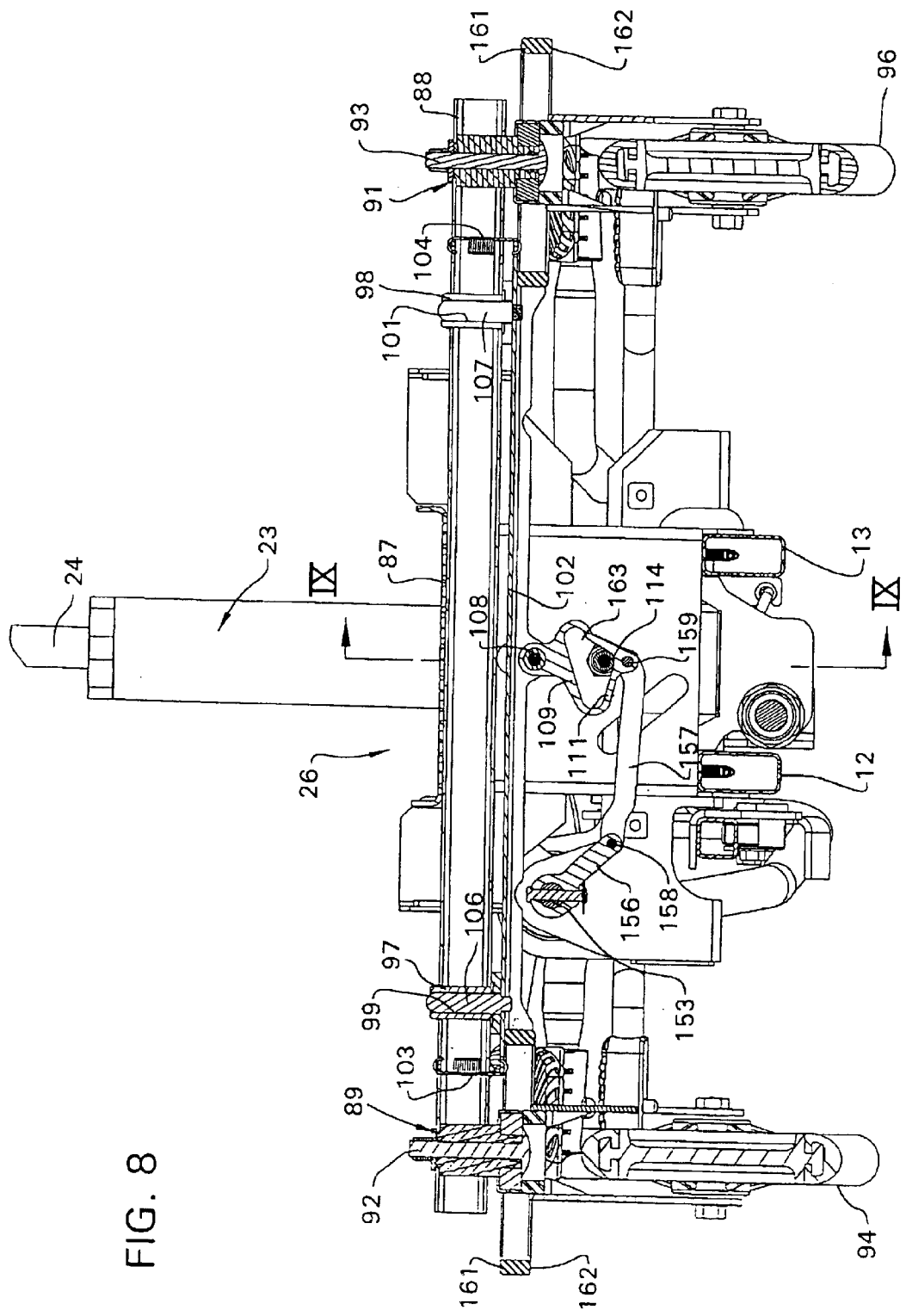
FIG. 8 is a sectional view taken along the line VIII—VIII of FIG. 3.

As illustrated in FIG. 8, the rightmost corner 163 of the triangular shaped opening 111 is notched so that when the roller 114 rolls into it, the spring force provided by the springs 103 and 104 will be unable to lift the elongate bar 102. As a result, the brakes will remain in the engaged condition as long as the roller 114 remains in the notch 163.

An additional force holding the roller 114 in the notch 163 is created by the elastic yieldability of the elongate rod 102 causing the midpoint of the elongate rod 102 to flex downwardly when the lower edges 162 of each of the rings 161 engage the peripheral surface of a respective pair of wheels 94 and 96.

A crank arm 171 (FIG. 5) is secured to the elongate rod 153 and connects to the cam element 138 to operate in the same way and in unison with the brake structure described above to effect a braking of the wheels 131 and 132 simultaneous with a braking of the wheels 94 and 96 through rings 161 engagable therewith.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An elongate base for a patient supporting platform, comprising;

a frame;

first and second hydraulic jacks mounted at spaced apart locations on said frame adjacent opposite ends thereof, each of said first and second hydraulic jacks being configured to connect to said patient supporting platform for effecting a lifting and lowering of said patient supporting platform relative to said frame, said first and second hydraulic jacks each having a reciprocal input mechanism for effecting when reciprocated a lifting of the respective end of the patient supporting platform, each said reciprocal input mechanism having a first part of a two part releasable connection thereon;

a manually operable member and a mount for mounting said manually operable member for reciprocal movement relative to said frame;

a first linkage member having thereon a pair of longitudinally spaced second parts of each of said two part releasable connections, each said second part being releasably connected to a respective one of said first parts to effect a connecting of said manually operable member to each of said input mechanisms, said first linkage member being configured to convert the reciprocal movement of said manually operable member to a reciprocal movement of said first linkage member to effect a simultaneous lifting of said patient supporting platform in response to the reciprocal movement of said first linkage member;

wherein each said first part is an elongate rod having a first section of a first diameter, said first section having an annular groove therein defining a second section of a second diameter less than said first diameter;

wherein each said second part is a plate connected to said first linkage member and having a two sector opening therethrough, a first sector of said opening being configured for reception of said first section of said elongate rod therethrough so as to facilitate installation and removal of said first linkage member, said second sector of said opening being smaller in size than said first sector and being configured to receive therein only said second section of said elongate rod so as to facilitate a securement of said first linkage member to each of said reciprocal input mechanisms to thereby facilitate simultaneous operation of said reciprocal input mechanisms in response to reciprocal movement of said first linkage member.

2. The elongate base according to claim 1, wherein said second sector is oriented vertically above said first sector so that a self-contained weight of said first linkage member will cause said second section of said elongate rod to operatively remain in said second sector during reciprocal movement of said first linkage member.

3. An elongate base for a patient supporting platform, comprising:

a frame;

first and second hydraulic jacks mounted at spaced apart locations on said frame adjacent opposite ends thereof, each of said first and second hydraulic jacks being configured to connect to said patient supporting platform for effecting a lifting and lowering of said patient supporting platform relative to said frame, said first and second hydraulic jacks each having a reciprocal input mechanism for effecting when reciprocated a lowering of said patient supporting platform, each said reciprocal input mechanism having a first part of a two part releasable connection thereon;

a first manually operable member and a first mount for supporting said first manually operable member for reciprocal movement relative to said frame;

a first linkage member having thereon a second part of said first two part releasable connection, said second part being releasably connected to said first part to effect a connecting of said first manually operable member to said reciprocal input mechanism on said first hydraulic jack, said first linkage including a releasable coupling mechanism interconnecting said first linkage member and said first manually operable member;

a second manually operable member and a second mount for supporting said second manually operable member for reciprocal movement relative to said frame;

a second linkage member having thereon a second part of said first two part releasable connection, said second part being releasably connected to said first part to effect a connecting of said second manually operable member to said reciprocal input mechanism on said second hydraulic jack, said second linkage member including a releasable coupling mechanism interconnecting said second linkage member and said second manually operable member.

4. The elongate base according to claim 3, wherein said first and second linkage members are both elongate rods, wherein each reciprocal input mechanism includes a rod receiving pocket thereon, each said pocket releasably receiving therein one end of a respective said elongate rod to thereby define said first part of said first two part releasable connections thereat, each said elongate rod having a respective opposite end and one part of a second two part releasable connection thereat, said first and second manually operable members each having a second part of said second two part releasable connection operatively coupled to respective said one parts.

5. An elongate base for a patient supporting platform, comprising:

a frame;

a manifold plate mounted on said frame;

a hydraulic jack configured to connect to said patient supporting platform for effecting a lifting and lowering of said patient supporting platform relative to said frame, said manifold plate having connective passageways hydraulically connected to said hydraulic jack and a reciprocal input mechanism for effecting when reciprocated a lowering of said patient supporting platform, said reciprocal input mechanism comprising a plunger reciprocally movably supported in a hollow sleeve and having a region along a length thereof of reduced cross sections, at least one of said connective passageways being hydraulically connected to and extending between a hydraulic fluid reservoir for said hydraulic jack and said region;

a valve member on said plunger oriented adjacent one end of said region and being reciprocally movable with said plunger, a valve seat on said hollow sleeve adjacent said one end of said region at least when said valve member and said valve seat engage one another;

an elastically yieldable member for effecting continual urging of said valve member toward said valve seat;

hydraulic fluid pressure equalizing means on said plunger and said hollow sleeve for assuring equalized fluid pressure acting on both ends of said region so that only a return force of said elastically yieldable member needs to be overcome in order to cause movement of said valve member away from said valve seat.

6. The elongate base according to claim 5, wherein said hydraulic jack is mounted directly onto said manifold plate.

7. The elongate base according to claim 6, wherein said base includes a manually operable member and a mount for supporting said manually operable member for reciprocal movement relative to said frame.

8. The elongate base according to claim 7, wherein said base additionally includes an elongate linkage, one end of which is operatively connected to said manually operable member and another end of which is connected to one end of said plunger remote from said valve member.

9. The elongate base according to claim 8, wherein said one end of said plunger includes a pocket, said one end of said linkage being releasably received in said pocket.

10. An elongate base for a patient supporting platform, comprising;

a frame;

first and second hydraulic jacks mounted at spaced apart locations on said frame adjacent opposite ends thereof, each of said first and second hydraulic jacks being configured to connect to said patient supporting platform for effecting a lifting and lowering of said patient supporting platform relative to said frame, said first and second hydraulic jacks each having a reciprocal input mechanism for effecting when reciprocated a lifting of the respective end of the patient supporting platform, each said reciprocal input mechanism having a first fastener part of a two part releasable fastener connection thereon, said two part releasable fastener connection being configured for a connected condition and an unconnected condition;

a manually operable member and a mount for mounting said manually operable member for reciprocal movement relative to said frame; and a linkage member having thereon a pair of longitudinally spaced second fastener parts of each of said two part releasable fastener connections, said first and second fastener parts being configured to releasably connect to and disconnect from a respective other of said first and second fastener parts to effect a connecting of said manually operable member to each of said reciprocal input mechanisms, said first linkage being configured to convert the reciprocal movement of said manually operable member to a simultaneous reciprocal movement of said first linkage member and said reciprocal input mechanisms through a connected said first and second fastener parts to effect a simultaneous lifting of said patient supporting platform in response to the reciprocal movement of said manually operable member.

11. The elongate base for a patient supporting platform according to claim 10, wherein the configuration of said first and second parts enables the connecting and disconnecting to occur without a use of auxiliary tools.

12. The elongate base for a patient supporting platform according to claim 11, wherein a self contained weight of said linkage member maintains at least one of said first and second fastener parts in said connected condition.

* * * * *

UNITED STATES PATENT AND TRADEMARK OFFICE
CERTIFICATE OF CORRECTION

PATENT NO. : 6,820,294 B2
DATED : November 23, 2004
INVENTOR(S) : Jeffrey C. Shiery et al.

It is certified that error appears in the above-identified patent and that said Letters Patent is hereby corrected as shown below:

<u>Title page,</u>
Item [75], Inventors, delete "Jerry Wheeler, Kalamazoo, MI (US)"

Signed and Sealed this

Twelfth Day of July, 2005

JON W. DUDAS
*Director of the United States Patent and Trademark Office*